United States Patent [19]

Jamoussi et al.

[11] Patent Number: 5,430,871
[45] Date of Patent: Jul. 4, 1995

[54] METHOD OF DYNAMICALLY ADDING AND REMOVING DB2 ACTIVE LOGS

[75] Inventors: Anouar Jamoussi; David L. Janicek, both of Houston, Tex.

[73] Assignee: BMC Software, Inc., Houston, Tex.

[21] Appl. No.: 970,336

[22] Filed: Oct. 27, 1992

[51] Int. Cl.⁶ ............................ G06F 7/42; G06F 12/00
[52] U.S. Cl. ..................................... 395/600; 395/425; 364/DIG. 2
[58] Field of Search ................... 395/600, 425; 371/12, 371/7, 30, 48; 364/DIG. 2

[56] References Cited

U.S. PATENT DOCUMENTS 5,043,866  8/1991  Myre .................................. 395/600

OTHER PUBLICATIONS

Mohan, "Aries-RRH: Restricted Repeating of History in the ARIES Transaction Recovery Method", pp. 718-727 1991.
Brian W. Kernighan & Dennis M. Richie, "The C Programming Language", Prentice Hall, 1978, pp. 89-142.
Jay Ranade, Mukesh Sehgal, Phyllis Elkind & Joseph Grossmann, "DB2 Concepts, Programming, and Design", McGraw-Hill, 1991, pp. 3-43, 219-223, 337-338.

*Primary Examiner*—Thomas G. Black
*Assistant Examiner*—Jean R. Homere
*Attorney, Agent, or Firm*—Arnold, White & Durkee

[57] ABSTRACT

In a novel method of dynamically adding or removing active logs in a DB2 subsystem without the necessity of cycling DB2, a set of control blocks emulating certain DB2 control blocks is constructed. In adding an active log, a call to a DB2 module is made to allocate the new active log data set and create a new LDSD control block for the new active log data set. The NEW and REUSABLE status flags are set in the new LDSD control block, initialization of the new LDSD control block is completed, and the new LDSD control block is added to the LDSD chain off the LMB. The BSDS record(s) and the cached portions of the BSDS information are updated to reflect the addition of the new active log. In removing an active log, the LDSD of the active log is removed from the LDSD chain and an attempt is made to deallocate the active log data set via a call to a DB2 module. If the deallocation attempt is unsuccessful, the active log's LDSD is reinserted in the chain off the LDSD; if the attempt is successful the BSDS and the cached portions of the BSDS are updated to reflect the removal of the active log.

2 Claims, 8 Drawing Sheets

Microfiche Appendix Included
(3 Microfiche, 286 Pages)

| | |
|---|---|
| START: Initialize control blocks | 6.1 |
| DB2 Release 2.3? | 6.2 |
| YES: 6.3 Set CCB and ROB control block length variables to lengths of CCB and ROB in DB2 Release 2.3 | NO: 6.4 Set CCB and ROB control block length variables to lengths of CCB and ROB in DB2 Release 2.2 |
| Program Temporary Fix (PTF) Release? | 6.5 |
| YES: Set EB length variable to Large 6.6 Set ACE length variable to Large 6.8 | NO: Set EB length variable to Small 6.7 Set ACE length variable to Small 6.9 |
| Obtain & initialize ACE_X | 6.10 |
| Initialize EB_X | 6.11 |
| Obtain & initialize ROB_X | 6.12 |
| Obtain & initialize CCB_X | 6.13 |
| Obtain & initialize XSB_X | 6.14 |
| Obtain & initialize STSV_X | 6.15 |
| Obtain & initialize SKB_X | 6.16 |
| RETURN | |

FIG. 6

| | |
|---|---|
| START: Add active log | 7.1 |
| Check for sufficient storage in BSDS record(s) | 7.2 |
| Invoke DB2 module DSNJDSO1 w/ ALLOCATE request to allocate new active log data set | 7.3 |
| Add NEW and REUSABLE status flags, complete initialization of new active log | 7.4 |
| Obtain LMB LOG WRITE latch | 7.5 |
| Determine location and add new LDSD to LDSD chain off LMB | 7.6 |
| Obtain BSDS ACCESS latch, update BSDS to reflect new active log | 7.7 |
| Update cached in-memory copy of BSDS info | 7.8 |
| Release latches | 7.9 |
| RETURN | |

FIG. 7

| | |
|---|---|
| START: Remove active log | 8.1 |
| Obtain LMB LOG WRITE latch | 8.2 |
| Remove LDSD of active log from LMB chain | 8.3 |
| Invoke DB2 module DSNJDSO1 w/DEALLOCATE request to deallocate active log data set | 8.4 |
| Deallocation successful? | 8.5 |
| YES: Continue — 8.6 \| NO: Replace LDSD of active log chain off LMB — 8.7 / RETURN error code — 8.8 | |
| Obtain BSDS ACCESS latch, update BSDS to reflect deletion of active log | 8.9 |
| Update cached in-memory copy of BSDS info | 8.10 |
| Release latches | 8.11 |
| RETURN | 8.12 |

FIG. 8

METHOD OF DYNAMICALLY ADDING AND REMOVING DB2 ACTIVE LOGS

BACKGROUND OF THE INVENTION

CROSS-REFERENCES

Related Applications: This application is one of four U.S. patent applications being filed simultaneously, all of which are commonly assigned, namely:

Ser. No. 07/970,335, METHOD OF DYNAMICALLY CANCELING A DB2 THREAD, by David L. Janicek;

Ser. No. 07/970,334, METHOD OF DYNAMICALLY EXPANDING OR CONTRACTING A DB2 BUFFER POOL, by David L. Janicek;

Ser. No. 07/970,337, METHOD OF DYNAMICALLY EXPANDING A DB2 EDM POOL, by David L. Janicek;

Ser. No. 07/970,336, METHOD OF DYNAMICALLY ADDING OR REMOVING DB2 LOGS, by Anouar Jamoussi and David L. Janicek.

Microfiche Appendix: The microfiche appendix to this specification contains source code listings of a series of copyrighted computer program routines that are the property of the assignee of this application. Permission is granted to make copies of the appendix and its contents solely in the course of creating facsimile copies of a patent issuing on this application and for no other purpose. All other rights under copy-right or similar law are reserved.

Glossary and Bibliography: A general-purpose glossary of certain terms of art and a list of potentially helpful references for further reading are set out as an appendix to the printed specification of this application. References are indicated in the text of the specification in conventional fashion, e.g., "[Smith]" might indicate an article by Smith. Both the glossary and the list of references are intended solely as an aid to understanding the invention and not as limiting the scope of the inventive subject matter defined in the claims.

The DB2 Database System

This invention relates to the use of database software such as the well-known DATABASE 2 database software distributed by IBM Corporation, commonly referred to colloquially in the art as "DB2." As is well known to those of ordinary skill, generally speaking DB2 operates as a subsystem in a computer system that itself is operating under the IBM MVS operating system software. More specifically, the invention relates to a method by which a user of a DB2 application can dynamically add and remove DB2 active logs without affecting the availability of the database system or of DB2 applications.

Generally speaking DB2 operates as a subsystem in a computer system that itself is operating under the IBM MVS operating system software. A given MVS system may have more than one DB2 subsystem operational at any particular time. In this specification the term "DB2" is used to refer to an arbitrary single DB2 subsystem.

Figure 1:
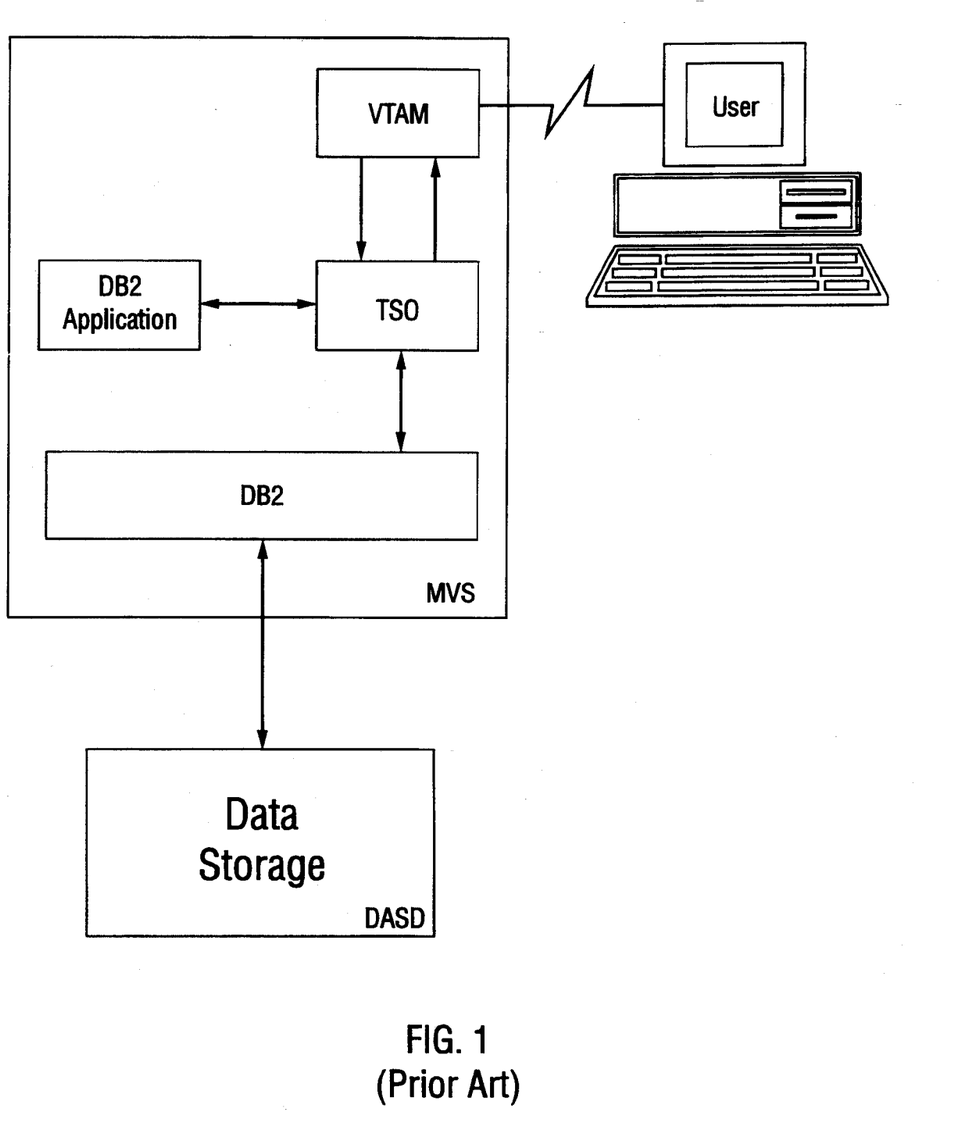
FIG. 1 is a block diagram showing in greatly simplified form the relationship between DB2 and a DB2 application program.
Figure 2:
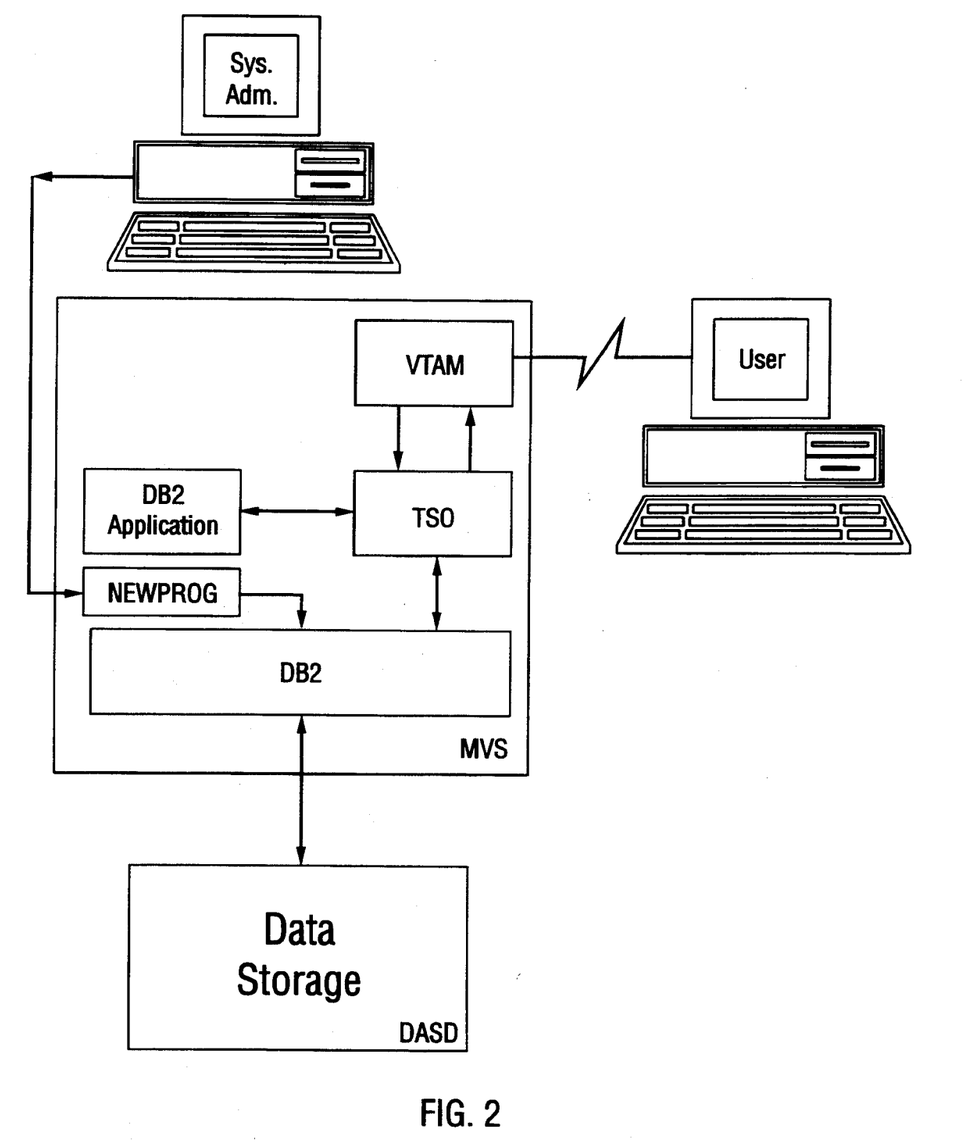
FIG. 2 is a similar block diagram in which a computer program in accordance with the invention is added in to that relationship.

FIG. 1 illustrates, in greatly simplified form, one typical type of configuration in which DB2 is used. In such a configuration, DB2 interacts with the well-known IBM Time Sharing Option (TSO) software. An application program labeled "DB2 APPLICATION" indirectly makes use of DB2-provided services, via calls to TSO, to read from and write to data storage labeled DASD. Such an application program is commonly referred to generically in this context as a "DB2 application." The DB2 application typically communicates indirectly with a user via calls to communications management software such as, e.g., the well-known IBM Virtual Terminal Access Method (VTAM) software.

DB2 Logs

As is well-known to those of ordinary skill, DB2 maintains a number of "logs." A log is a linear data set (LDS) structured to conform to IBM's Virtual Storage Access Method (VSAM). In essence, a log serves as something like a logbook or chronological journal of DB2's activity. Generally speaking, when DB2 updates data in a DB2 object, the type of update event or transaction is recorded in a log along with both the old and new data. As a result, in certain circumstances involving corruption of dam, e.g., abnormal termination of a DB2 application, DB2 can attempt to use the logged information to recover as much of the corrupted data as possible. Such transactions are recorded initially in an "active log" in memory for quick access. The DB2 active log is the prime source of recovered data that has not been archived.

DB2 utilizes a fixed number of active logs, with the number and size of the logs being set at DB2 initialization time. DB2 may be configured by the database administrator (DBA) to maintain two or more active logs in memory, of which one is always the "current active log."

Figure 3:
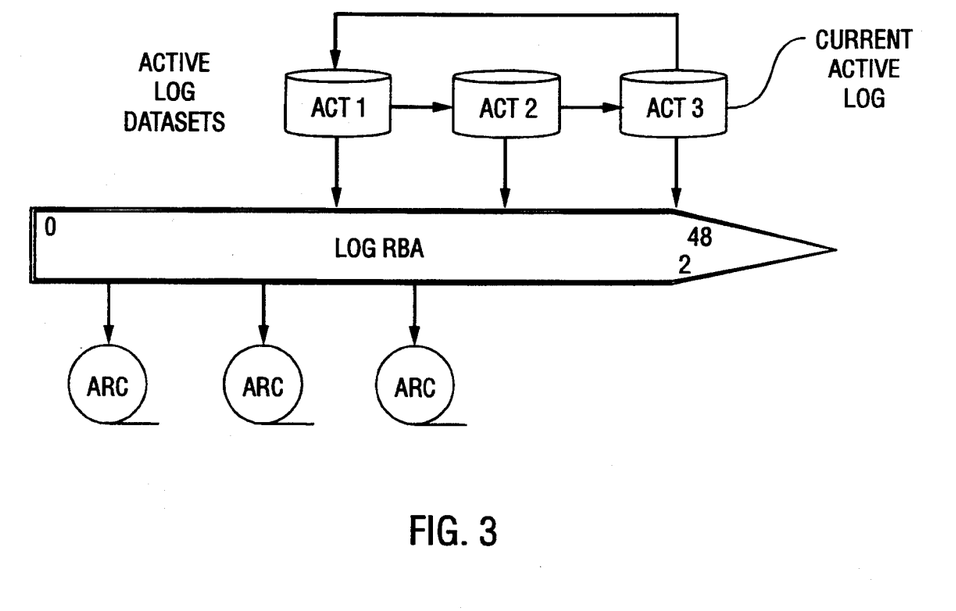
FIGS. 3, 4, and 5 depict prior-art aspects of DB2 as described in more detail above.

As illustrated in simplified form in FIG. 3, DB2 maintains the active logs as, in effect, a single logically infinite log by performing a round-robin type of operation, switching from a full active log (e.g., ACT3 if FIG. 3) to the least recently used active log data set (e.g., ACT1) and overwriting it. This normally does not cause a problem because the active-log information in the least recently used active log data set is ordinarily copied off to an archive log prior to being selected for overwriting. At the database administrator's option, the DB2 subsystem can be operated in "dual active log chain" mode. In that mode, for redundancy purposes the active log chain is kept in duplicate copies, referred to as copy 1 and copy 2.

Figure 4:
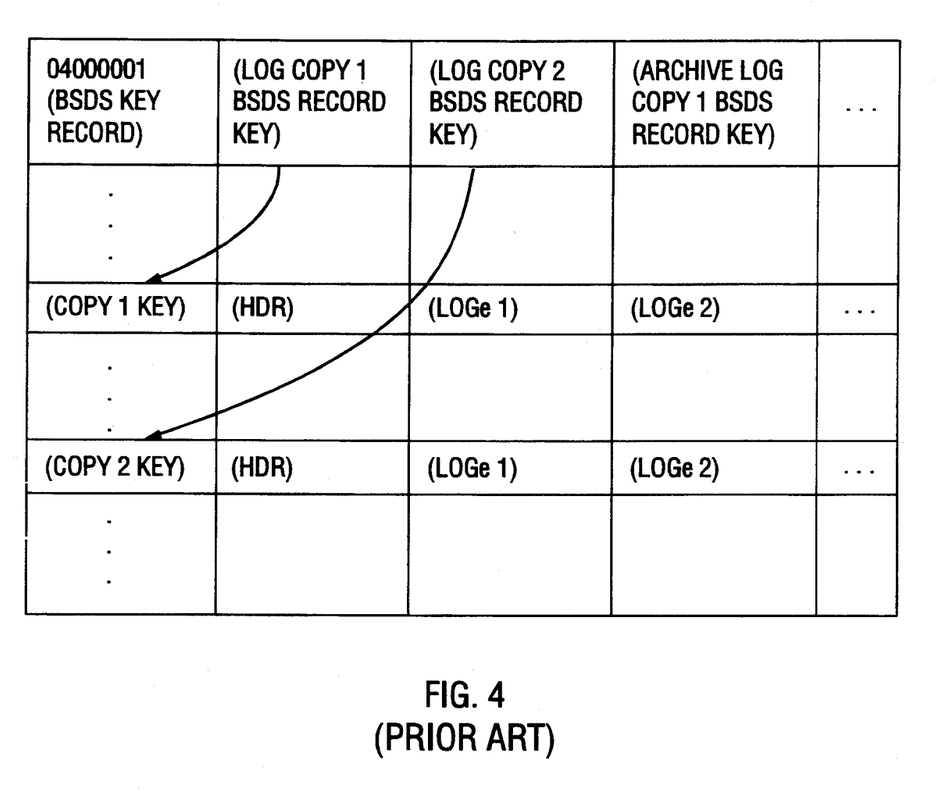

During operation DB2 refers to a bootstrap data set (BSDS), illustrated in simplified form in FIG. 4, to determine what active logs are available. The bootstrap data set is a VSAM key sequence data set that in many respects functions as a restart data set; that is, the BSDS provides a storage area in which DB2 keeps track of its own current status in case it must be restarted (e.g., after a system failure).

The BSDS includes an active log copy 1 record; if the DB2 subsystem was started in dual active log mode the BSDS also includes an active log copy 2 record. Each of the active log copy 1 and 2 records comprise a 4K page of storage, which effectively limits the size of the active log chain because when the available space in the BSDS record is exhausted, no more active logs can be added. The BSDS also includes records in which DB2 keeps track of its archive data sets. Whenever DB2 adds, or archives, an active log, it updates the active log record (including the active log's relative byte address or RBA, assigned by DB2) in the BSDS.

In FIG. 4, a BSDS key record includes an identifying code shown in the Figure as 04000001, followed by (i) the respective record keys of the active log copy 1 and copy 2 records, and (ii) the respective record keys of the archive log copy 1 and copy 2 records. Each of the active log copy 1 and copy 2 records includes the record's key followed by header information labeled HDR and by a series of fields labeled LOGe1, LOGe2, etc., each representing an active log and its status information such as its data set name, status flags (described in more detail below), RBA ranges, timestamps, etc.

Figure 5:
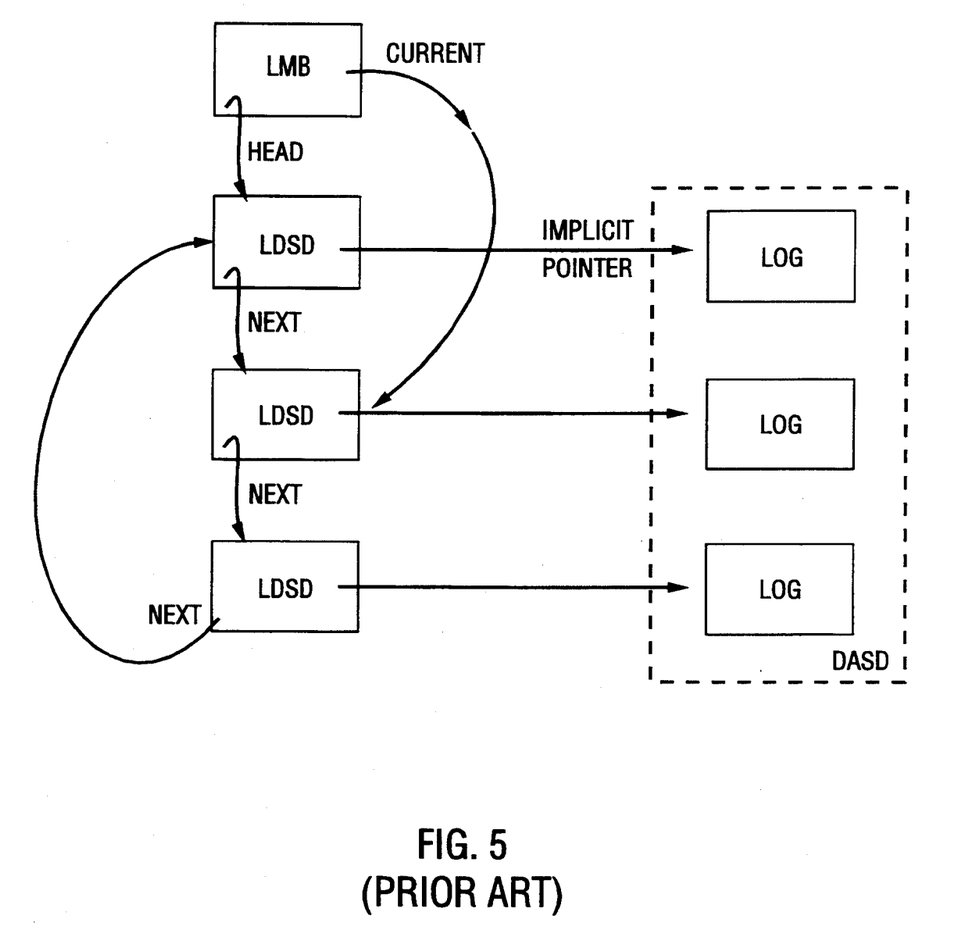

As illustrated in simplified form in FIG. 5, DB2 also utilizes a log management control block (LMB) in managing its active logs. The LMB has "chained" to it (i.e., the LMB includes pointers to the head of a chain of) two or more control blocks LDSD in a circular chain, with each LDSD representing an active log data set labeled LOG. The LMB also includes a pointer to the current active log. In addition (but not shown in FIG. 5), the LMB includes a pointer ALW1, pointing to an in-memory (cached) copy of the COPY 1 BSDS record, and if in dual active log mode, a pointer ALW2 pointing to a similar cached copy of the COPY 2 BSDS record.

Each LDSD control block includes a status code for the associated log. The status codes include STOPPED (indicating that the log may not be used for some reason), NEW (indicating that the log may be used to write transaction records but that no such writing has yet occurred), TRUNCATED (used to indicate that only part of the log includes transaction data, e.g., because the log's duplicate or counterpart in a dual active log chain has a smaller storage capacity than the log), and REUSABLE (indicating that the contents of the log have been copied to permanent or archived storage and thus that the memory used for the log can be overwritten if necessary).

Active logs are always open and available to DB2 while DB2 is active. DB2 writes transaction records to and reads transaction records from these logs on-line. Each active log is shared by all DB2 threads executing under that DB2 subsystem; more precisely, DB2 writes information for all associated DB2 threads to the current active log.

When no more storage is available in the current active log (e.g., because all storage in the current active log has been used up in writing transaction records), DB2 switches to use the next active log in the chain. DB2 updates accordingly the LMB pointer to indicate that the next active log is now the current active log. DB2 also copies the contents of the former current active log to archival storage and sets the REUSABLE status code in the LDSD for that log. Log switching is also recorded by DB2 in the BSDS.

The Problem of Fixed DB2 Active Log Capacity

In environments where computer-system and application-program availability is a prime concern, it is normally desirable to have enough active log space to perform timely recovery. When a new DB2 application is brought up, for example, it can sometimes be difficult to predict how many insertions, deletions, and updates may occur in the data associated with that application. That in turn makes it difficult to predict the net additional active log requirements. If data compression is used in a DB2 application, it can be even harder to predict active log requirements. Data compression causes each row (record) to be treated as a variable-length row; that means that any change taking place in a column (field) will be logged as well as all dam to the end of the row in question. Moreover, although the current generation of DASD devices is generally regarded as quite reliable, and although DB2 has the ability to use dual active logs for redundancy, I/O errors can still pose problems of downtime or concern about the availability of DB2.

One long-recognized problem with DB2 is that neither the number nor size of the active DB2 logs can be increased or decreased dynamically. Thus, tuning of the active logs is not feasible without bringing down DB2 (i.e., terminating the execution of DB2), changing the parameters defining the active log number and size, and bringing DB2 back up. The process of bringing DB2 down for the purpose of making parameter changes, then bringing it back up again, is sometimes referred to as "cycling" DB2. Cycling of DB2 frequently results in serious inconvenience to users of DB2 because bringing down DB2 necessarily causes an outage (i.e., unavailability) of all application programs that use DB2. Thus, data bases supported by those application programs become unavailable to users for the duration of the outage.

A related problem is associated with correcting I/O errors on-line. DB2 marks any bad active log associated with such an error as STOPped; correcting the error may require cycling DB2, especially if the STOPped log is the only active log remaining.

Furthermore, if DB2 must recover corrupted data (e.g., if a table space becomes corrupted), the recovery process generally proceeds much faster if it utilizes an active log as opposed to an archive log. If a database administrator installs ("brings up") a new DB2 application, a situation may occur in which the amount of active log space is suboptimal, possibly resulting in degraded performance and recoverability.

A long-felt need has thus existed among database administrators for the capability of dynamically adjusting the active log parameters of DB2 without cycling DB2.

SUMMARY OF THE INVENTION

In a novel method of dynamically adding or removing active logs in a DB2 subsystem without the necessity of cycling DB2, a set of control blocks emulating certain DB2 control blocks is constructed.

In adding an active log, a call to a DB2 module is made to allocate the new active log data set and crate a new LDSD control block for the new active log data set. The NEW and REUSABLE status flags are set in the new LDSD control block, initialization of the new LDSD control block is completed, and the new LDSD control block is added to the LDSD chain off the LMB. The BSDS record(s) and the cached portions of the BSDS information are updated to reflect the addition of the new active log.

In removing an active log, the LDSD of the active log is removed from the LDSD chain off the LMB and an attempt is made to deallocate the active log data set via a call to a DB2 module. If the deallocation attempt is unsuccessful, the active log's LDSD is reinserted in the LDSD chain; if the attempt is successful the BSDS and the cached portions of the BSDS information are updated to reflect the removal of the active log.

DETAILED DESCRIPTION OF SPECIFIC EMBODIMENTS

One illustrative embodiment of a method in accordance with the invention is described below as it might be implemented in a computer program (referred to here for convenience as "NEWPROG"). An actual implementation of such a program might be executable on, e.g., an IBM System 370-compatible machine or equivalent running IBM OS/VS SP2 (MVS/XA), SP3 or SP4 (MVS/ESA) and IBM Database 2 (DB2) version 1.3 or later, or on one or more other suitable computer systems. For purposes of further illustration, the microfiche appendix sets out selected extracts of source code from an actual software package owned and distributed under license by the assignee under the trademark OPERTUNE.

In the interest of clarity, not all features of an actual implementation are described in this specification. It will of course be appreciated that in the development of any such actual implementation (as in any software development project), numerous programming decisions must be made to achieve the developers' specific goals and subgoals (e.g., compliance with system- and business-related constraints), which will vary from one implementation to another. Moreover, attention will necessarily be paid to, e.g., proper serialization to handle concurrent events. It will be appreciated that such a development effort might be complex and time-consuming, but would nevertheless be a routine undertaking of MVS system program development for those of ordinary skill having the benefit of this disclosure.

When invoked by a user such as a DB2 database administrator, NEWPROG carries out the method of adding or removing active logs, as requested by the database administrator, by issuing a request to the MVS operating system that a main routine be scheduled for execution under an SRB (service request block). That main routine performs or invokes performance of the functions described below.

Initialization: Building a Model of the DB2 Environment

Figure 6:
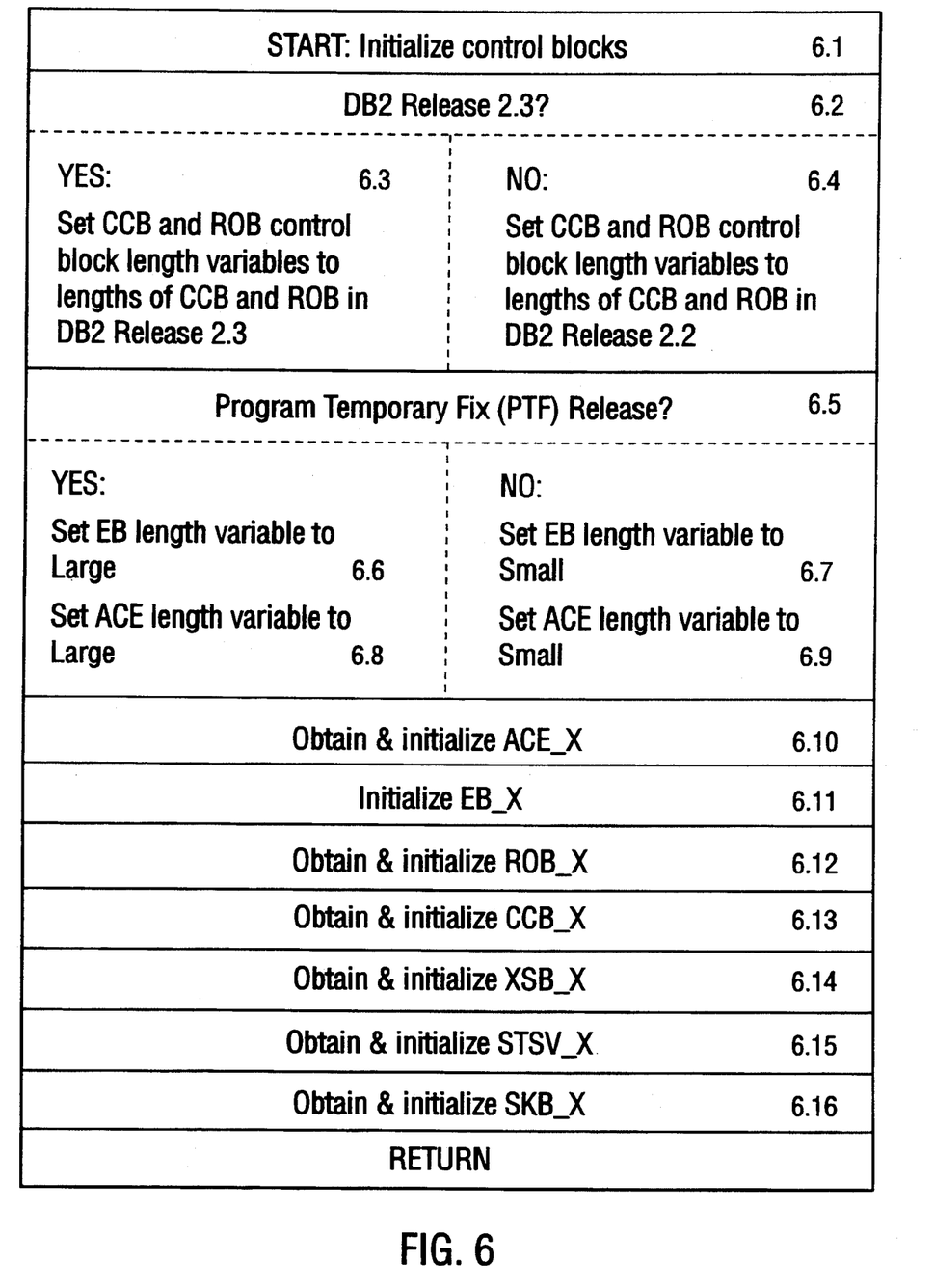
FIG. 6 is a flow chart of particular steps used in building a data structure to emulate certain control blocks used by DB2.

As illustrated in FIG. 6, NEWPROG performs as a prelude a series of definition and environment-value lookup steps (each of which by itself is conventional), then builds a data structure to emulate certain control blocks used by DB2 to store parameters about the thread. While some of these control blocks are documented in various DB2 information manuals, others are undocumented and had to be determined empirically. The address of the control block SCOM for the DB2 environment being modeled is used as an input; the address of a control block referred to as EB_X, emulating the DB2 control block of the same name for the thread in question, is returned as an output.

Block 6.2: It has been found that different releases of DB2 may make use of CCB and ROB control blocks that are of the same name and general structure but of different lengths. In particular, DB2 releases prior to 2.3 use CCB and ROB control blocks of different lengths than those of release 2.3. Whether the DB2 installation is release 2.3 is tested by a conventional examination of the operating system's DB2 installation information in the DECP control block. Variables containing the lengths of DB2's CCB and ROB control blocks are initialized to the appropriate values depending on whether the DB2 release is 2.3 or earlier.

Block 6.5: If a Program Temporary Fix (PTF) is in effect, the EB and ACE control blocks in DB2 will have different lengths than otherwise. Accordingly, NEWPROG determines whether a PTF is in effect by conventional examination of operating system information, and sets a flag iPTF if so. If the iPTF flag is set, then respective variables defining the length of the EB and ACE control blocks are set to respective Large values, else to respective Small values.

It has been determined empirically that DB2 apparently maintains unique identifying codes for various control blocks such as the ACE control block. Most of those codes may be determined conveniently by "running the chains" of the DB2 control blocks (referring to the documentation of those control blocks in the aforementioned IBM publications) to locate the control block of interest, then calling a dump analysis package such as IPCS distributed by IBM, or the DB2 dump formatting utility such as the program DSNWDMP provided with DB2, to examine the control block and thereby obtain its identifying code.

Block 6.10: An ACE_X control block, for emulating DB2's ACE control block of the same name, is created and initialized by obtaining a segment of free storage (the size or length of which was determined in the steps beginning at block 6.2) with a GETMAIN statement. That storage is obtained from subpool 241; it may be either above or below the 24-bit addressable storage line, and must be in Key 7 storage. Initialization of the ACE_X control block includes determining whether the EB control block for the DB2 installation will have a structure reflecting a DB2 PTF release, by checking whether the iPTF flag is set. Initialization also includes writing (i) the length of the ACE_X control block and (ii) the unique DB2 identifying code of the ACE control block being emulated, into the appropriate locations in the ACE_X control block. Later in the initialization, the address of the EB_X control block will also be recorded in the ACE_X control block.

Block 6.11: Because the ACE control block in DB2 includes the EB control block, initialization of the ACE_X control block also includes setting up an EB_X control block, as part of the ACE_X control block, to emulate the EB control block of DB2. The EB_X control block is initialized by writing to that control block (i) the length of the EB_X, as determined above, (ii) the DB2 identifying code of the EB, (iii) a pointer to the DB2 control block RMVT, (iv) the EB flag A, (v) the EB flag D, (vi) the EB's home ASCE, and (vii) a flag indicating whether the routine running at any particular time is running in the DB2 master address space or in the DB2 data base's address space.

Block 6.12: Similar steps are performed to obtain and initialize a control block ROB_X. Again, a GETMAIN is performed to obtain a block of free Key 7 storage from subpool 241; the length of the block is the variable iROBLEN, determined in block 6.2 as described above. The address of this block of storage, i.e., the new ROB_X control block, is recorded in the ACE_X control block. The ROB_X control block is initialized by recording in it (i) the unique DB2 identifying code of the ROB, (ii) the length of the ROB_X, and (iii) a pointer back to the ACE_X control block. Thus, a chain of pointers has been created from the ACE_X control block to the EB_X control block to the ROB_X control block and back to the ACE_X control block.

Block 6.13: A control block CCB_X is created and initialized in similar fashion. Again, a GETMAIN is performed to obtain a block of free Key 7 storage from subpool 241; the length of the block is the the variable iCCBLEN, determined as described above. The address of this block of storage, i.e., the new CCB_X control block, is recorded in the ACE_X control block. The CCB_X control block is initialized by recording in it (i) the unique DB2 identifying code of the CCB, (ii) the length of the CCB_X, and (iii) in the field corresponding to the user identification field of DB2's CCB control block, an identifier indicating that the user is the Install SYSADM (i.e., the installation system administrator, who by definition has unlimited access privileges in DB2).

Block 6.14: A control block XSB_X, emulating the MVS control block of the same name, is obtained by executing a GETMAIN to obtain a block of free Key 7 storage in subpool 241. The XSB is used by MVS to handle SRBs that are suspended and then later resumed. Storage for XSB_X may be taken from below the 16-meg line to take into account the possibility that some older versions of MVS's SRB dispatcher may assume that the XSB is located in this region of storage. The block of storage for the XSB_X may have a fixed length (i.e., the size of the MVS control block XSB), and therefore the required size of the block need not be determined as it was for the ACE, EB, ROB, and CCB.

Block 6.15: Another GETMAIN is used to obtain storage for an SRB status save area control block STSV_X in Key 7 storage, subpool 241, of fixed length, below the 16-meg line. The STSV_X is initialized to include a pointer to the XSB_X control block; in addition, the address of the STSV_X is saved as a pointer in the EB_X control block.

Block 6.16: A stack storage block SKB_X, to emulate the DB2 control block of the same name, is obtained and initialized. The size of the SKB_X is dependent on whether the release of DB2 is prior to release 2.20. A GETMAIN is issued to obtain a block of free Key 7 storage in subpool 241 below the 16-meg line. The SKB_X is initialized by recording in it (i) the unique DB2 identifying code of the SKB, (ii) the length of the SKB, (iii) a pointer to the EB_X control block, (iv) a "bottom" field indicating the last byte of the SKB_X, (v) an "available" field pointing to an area in the SKB_X that is available for use by application programs, (vi) a pointer to a current segment CSEG that points to itself, and (vii) a counter field that is initialized to a value of 1.

A pointer is returned to the newly built EB_X control block. An emulation or model environment has thus been created wherein the EB_X points to the ROB_X which in turn points to the ACE_X which points back to the EB_X. The EB_X control block also points to the STSV_X which points to the XSB_X and to the EB_X which in turn points to the SKB_X. This environment provides a standard set of control blocks that are useful in calling various specific DB2 routines for execution as discussed below (other control blocks may be built on an as-needed basis).

Adding an Active Log

Figure 7:
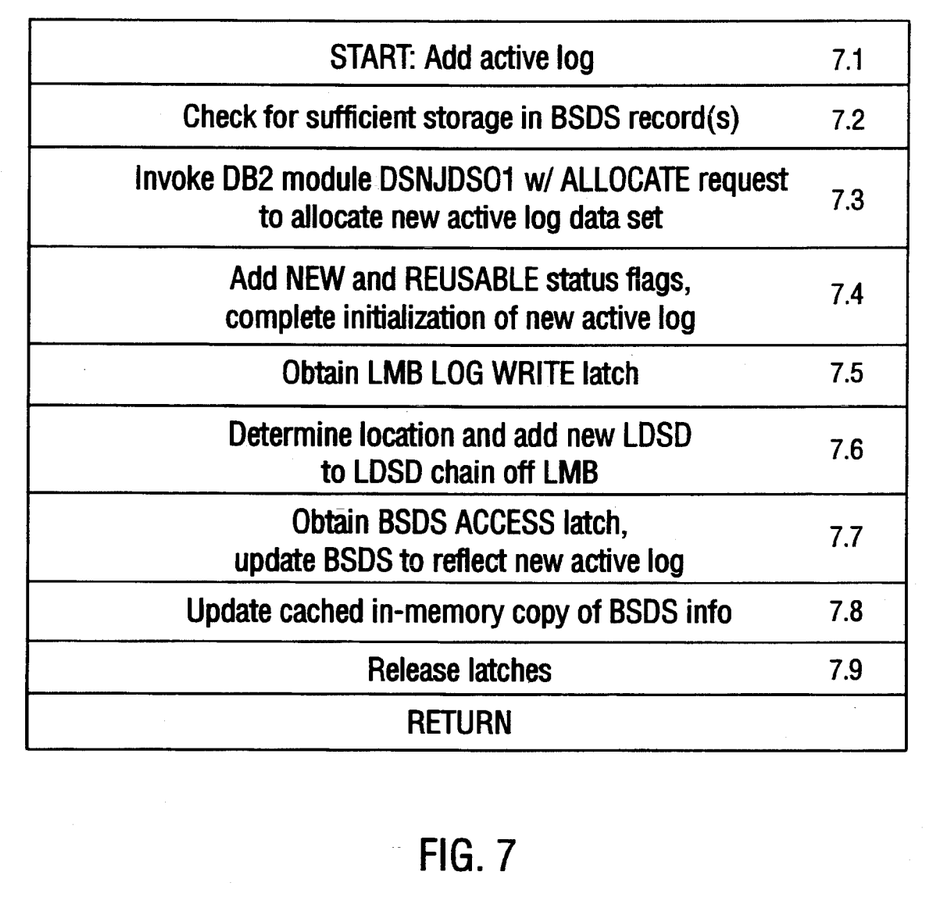
FIGS. 7 and 8 are flow charts in simplified form of steps executed in an illustrative implementation of two specific methods in accordance with the invention.

Referring to FIG. 7, NEWPROG checks to ensure that sufficient storage in the BSDS active log record(s) is available to add an active log; if not, an error message is returned. NEWPROG then attempts to locate a TCB in the DB2 master address space and schedules an IRB to run under that TCB and carry out essentially all of the rest of the functions described below.

In block 7.3, NEWPROG invokes the DB2 module DSNJDS01 to allocate the new active log data set. That module returns a pointer to an LDSD, partially initialized to describe the new data set. At block 7.4, NEWPROG adds to the new LDSD the status flags NEW and REUSABLE and finishes initializing the LDSD in accordance with DB2's documented standards. If the user specifies that the active log is to be initialized to be like an existing archive data set, NEWPROG tailors the initialization appropriately.

At block 7.5, NEWPROG obtains DB2's LMB LOG WRITE latch to serialize access to the LDSD chain (actually to both LDSD chains), thus preventing DB2 from making changes o:f its own with unpredictable results. At block 7.6 NEWPROG then adds the LDSD into the chain off the LMB by overwriting pointers to "splice in" the new LDSD. If the user specifies that the new LDSD is to be added in at a specific position in the chain, NEWPROG does so. On the other hand, if the user specifies that the active log is to be initialized to be like an existing archive data set (which NEWPROG treats as mutually exclusive from adding in the LDSD at a specified position, because the archived data set will have its own RBA range which means that the new active log's RBA sequencing must be kept consistent), NEWPROG computes the location at which the new LDSD is to be added to the chain. In either case, NEWPROG determines where the new active log will be added to the BSDS; based on that, NEWPROG determines where to add the new LDSD to the chain.

At block 7.7, NEWPROG updates the BSDS to reflect the new active log, first obtaining DB2's BSDS ACCESS latch to keep DB2 from making unpredictable changes during this process. If DB2 is in dual-BSDS mode (determined by the database administrator at DB2 startup time), NEWPROG makes corresponding changes to both BSDSs. The required operations are, in essence, those performed by the prior-art DB2 batch utility for adding an active log when DB2 is down, i.e., adding an entry to either the active log copy 1 or copy 2 record and registering a new active log in the BSDS.

At block 7.8, NEWPROG updates the cached information pointed to by the ALW1 and ALW2 information in the LMB to reflect the addition of the new active log. Finally, at block 7.9, NEWPROG releases the latches that were obtained as described above.

During the active-log addition process, NEWPROG keeps track of its status on an on-going basis; thus, if any part of the process goes awry, the changes made can be backed out and an appropriate report issued to the requesting user.

In a variation on the active log-addition process, if the DB2 subsystem was started in single active log chain mode, the user can request that NEWPROG switch the subsystem to dual active log chain mode, and vice versa.

In another variation, if the user requests that an active log be added for both copy 1 and copy 2, but the DB2 subsystem is running in single active log chain mode, NEWPROG allocates an LDSD for the copy 2 record and updates the information in the BSDS accordingly (so that the next time DB2 is cycled it restarts in dual active log chain mode), but does not alter the LMB chain.

Removing an Active Log

In response to a user request, NEWPROG removes active logs so long as there will be at least two active logs remaining (and provided that the user is not attempting to remove the current active log). The steps taken to remove an active log are in many ways the mirror image of those taken to add an active log.

Figure 8:
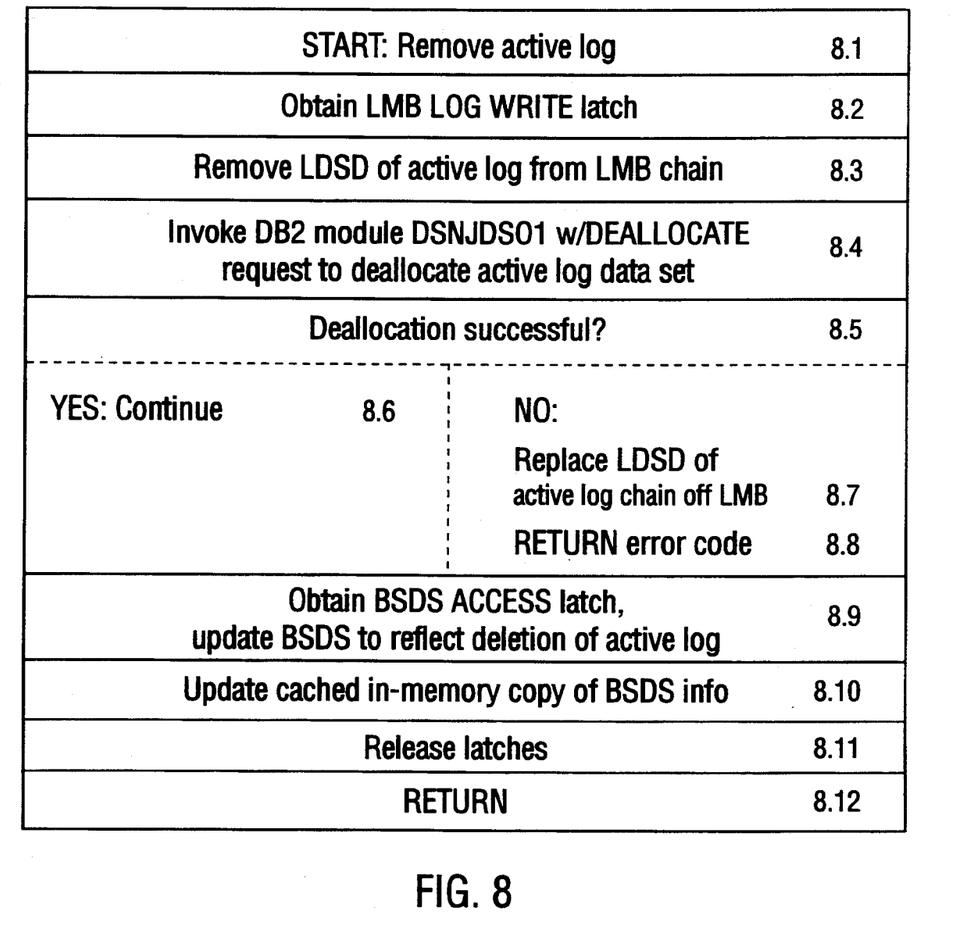

Referring to FIG. 8, at block 8.2 NEWPROG obtains DB2's LMB LOG WRITE latch to serialize access to the LDSD chain (actually to both LDSD chains), thus preventing DB2 from making changes of its own with unpredictable results. At block 8.3 NEWPROG then removes the LDSD of the active log being removed from the chain off the LMB by overwriting pointers as described above.

At block 8.4, NEWPROG invokes the DB2 module DSNJDS01 with a request that the active log data set in question be deallocated. If the DB2 subsystem is in dual active log chain mode, active log copy 1 or copy 2 or both are removed in this manner. At block 8.5, if this deallocation step is unsuccessful NEWPROG chains the active log back in as described above and returns an error message to the requesting user.

At block 8.9, if the deallocation is successful, NEWPROG obtains DB2's BSDS ACCESS latch and edits the BSDS to eliminate the entries for the active log being removed. One way of doing so is to search the BSDS to find the target active log entry, zero it out, and compact the chain by block-copying everything below the target entry to move it one up, then zeroing out the bottom.

At block 8.10, NEWPROG refreshes the cached in-memory copy of the BSDS record pointed to by ALW1 (and ALW2 if in dual active log chain mode) to reflect the removal of the active log, then releases the latches at block 8.11.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application.

GLOSSARY

The following general-purpose glossary is provided solely as a convenient aid to understanding for readers who may not be familiar with particular terms of art. The inclusion of a term in this Glossary should not be interpreted as necessarily being completely definitive of the meaning of the term, nor as necessarily limiting or expanding the scope of any claim.

16-megabyte line: Term used in some computer systems to denote the upper boundary of the first 16 megabytes of main memory. Sometimes referred to as the 24-bit line (because a sequence of 24 bits can be arranged in on-off combinations to define individual addresses for 16 megabytes of main memory locations).

24-bit line: See 16-megabyte line.

_X: When applied to a name as a suffix, used to identify a control block, a routine, etc., created to emulate (partially or completely) a corresponding control block, routine, etc., of DB2. For example, ACE_X is used to denote a control block created to emulate the DB2 control block ACE.

ACE: A DB2 control block.

Address: The "location" of, e.g., a specific variable in memory, a specific input/output device on an input-/output bus, etc. Typically, the term "location" actually refers to a unique identifier assigned to the variable, device, etc.; operations such as "writing" data to be stored in a particular portion of memory are accomplished by "broadcasting" the data to all portions of memory along with the identifier (address) of the memory portion that should actually receive and store the data.

Address space: An MVS term used to identify a collection of tasks used to perform a set of functions. (Primary address space, secondary address space)

Address space control block: An MVS control block encoding information about, and used to represent, an address space.

Ancestor chain: A chain of TCBs, each created by the previous TCB in the chain. As a hypothetical example, the ancestor chain of TCB-3 might be as follows: TCB-1 creates TCB-2, which in turn creates TCB-3.

API: Acronym for Application Program Interface, in essence a language or set of communications conventions by which an application program and an operating system can transmit work requests, status reports, etc., to each other.

ASCB: Acronym for address space control block.

ASCE: A DB2 control block. An ASCE exists for each address space that has a thread to DB2.

Asynchronous: If a first "agent" such as a process, a machine, etc., issues a request for a second agent to perform some work, the first agent might either suspend its own operations after issuing the request until it receives a report back from the second agent; this is commonly referred to as synchronous processing. Alternatively, the first agent might continue its own operations after issuing the request, often on the assumption that it will be notified when the second agent has completed its work; this is commonly referred to as asynchronous processing.

CCB: A DB2 control block identifying an individual thread.

Code: (a) Instructions for execution by a processor in a computer system. See also Source code, Executable code. (b) In DB2, a unique two-byte identifier assigned to a DB2 control block.

Computer program: A set of statements or instructions used directly or indirectly in a computer in order to bring about a certain result. Depending on the context, a computer program may comprise either or both of source code and executable code.

Control block: A data structure created and/or utilized by a computer program to keep track of information during the program's execution. A control block is roughly analogous to a set of working notes kept by the program. Depending on its design, a program may create, use, and/or discard several control blocks during its execution. See also Structure.

DB2: A common nickname or acronym for the Database 2 software system distributed by International Business Machines Corporation (IBM), extensively documented in various IBM publications such as [DB2DIAG].

EB: Acronym for "event block," a DB2 control block used to track a unit of work in DB2.

EUT: See Enable-Unlocked-Task.

Enable-Unlocked-Task: A task which has no processing restrictions.

Executable code: A series of one or more instructions executable after suitable processing by a computer or other programmable machine, without compilation or assembly.

Field: A defined part of a data record or data structure; roughly equivalent to a variable. For example, in a data base of employee information, the field "EmployeeName" in the data record for a given employee would be set to that employee's name. See also Control Block, Structure, Variable.

Flag: Typically, a true-false indicator as to some specified condition, or an "option A/option B" indicator.

FRR: See functional recovery routine.

Functional recovery routine: In the IBM MVS operating system, an error handling routine which can be used to recover from and/or obtain information about unanticipated program execution errors.

Initialize: (a) With respect to a variable, setting the variable to a specified value; (b) with respect to a routine, establishing initial conditions for execution of the routine.

INSTALL SYSADM: Used to denote DB2 installation system administrator; signifies the highest level of user/operator privilege in a DB2 installation.

Key 7 storage: Memory or other storage in a computer system whose contents can be altered only if the requestor possesses the appropriate "key," in this case Key 7.

Latch: In DB2, a flag or token used to serialize access to a shared resource. A DB2 thread that has been given exclusive access to such a resource is said to "hold the latch" for that resource. Associated with each thread is an EBLTCHLD flag word in storage that is used as a bit map of latches held by the thread.

Local lock: In the IBM MVS operating system, the lock is a mechanism to serialize the use of a particular shared resource. A call to the MVS function SETLOCK by a process causes MVS to attempt to obtain access to the resource for the process. If the resource is available, then the requesting process is "given the lock." If the resource is not available, i.e., if another process already has the lock, then the requesting process is suspended until the other process gives up the lock, indicating that its use of the shared resource is complete for the time being.

Maintenance release: A release of a computer program or software system that corrects actual problems with the program or system or that provides code for handling potential problems, typically problems discovered since the issuance of the previous release. Maintenance releases sometimes include additional capability or functionality for the computer program. See also PTF, Release.

Module: A portion of a computer program; sometimes referred to as a routine or a subroutine depending on the context.

MVS: IBM's MVS operating system, extensively documented in various IBM publications such as [MVSXA].

Operating system program: A computer program that manages some or all of a computer system and its hardware.

Pointer: A variable whose value is set to the address of, e.g., a memory location. For example, in some situations a particular field in a control block might be defined to be a pointer to another control block. A useful general introduction to pointers can be found in Chapter 5 of [K&R].

Primary address space: The default address space in which access to data and instructions is to be performed.

Processor system: A central processing unit (CPU) and one or more co-processors (e.g., math or graphics co-processors) associated with the CPU.

PTF: Acronym for "Program Temporary Fix," typically a computer program maintenance release that is not given a separate release number. See also Maintenance Release.

Record: In a database, a single set of formatted data. For example, in a database of employee information, a record might constitute all information about a given employee that is kept in that database. Data in a record is commonly divided into fields. See also Field, Structure.

Release: In the software industry, the term "release" typically refers to a (usually numbered) version of a computer program or software system distributed to licensees. Release numbering often takes the form "major.minor," e.g., release 1.0 signifies the first major release of a program that is distributed to licensees, while release 1.1 signifies the first minor release of that first major release. See also Maintenance release.

RMVT: A DB2 control block.

ROB: A DB2 control block.

Routine: A portion of a computer program; sometimes referred to as a subroutine or a module depending on the context.

Running the chains: Colloquial expression used to describe following a chain of pointers to arrive at an Nth data structure, i.e., examining a first data structure to obtain the address of a second data structure; examining the second data structure to obtain the address of a third data structure; and so forth.

SCOM: A DB2 control block.

Secondary address space: An address space used by some CPU instructions to access data.

SETLOCK: An MVS macro instruction; see "local lock."

Source code: A series of instructions or statements in an English-like high-level computer language such as FORTRAN, C, PASCAL, or LISP, or in a relatively low-level language such as the assembly language for a particular processor. Source code is normally readily readable by humans trained in the particular computer language in question. It is normally transformed by an interpreter or compiler into machine-readable executable code for actual use on a computer.

SRB: Acronym for Service Request Block. In the MVS operating system, one way in which an application program can request that work be performed by MVS is to create an SRB—a formatted control block defining the work request in conformance with the MVS API—and to pass the address of the SRB to MVS with a request to perform the work specified in the SRB. See also API, TCB.

Status Save Area: An MVS control block.

Structure: As defined in [K&R], "a collection of one or more variables, possibly of different types, grouped together under a single name for convenient handling. (Structures are called 'records' in some languages, notably Pascal.)" A useful introductory discussion of structures is set out in [K&R] chapter 6. See also Control Block.

Subpool: An identification code used to group or associate different blocks of storage.

Subroutine: A portion of a computer program; sometimes referred to as a routine or a module depending on the context.

Synchronous: See "asynchronous."

SYSADM: Acronym for System Administrator.

System variable: A variable defined and maintained by an operating system program.

TCB: Acronym for Task Control Block, an MVS control block.

Thread: In DB2, an information connection or attachment between DB2 and another MVS subsystem utilizing DB2's services. DB2 keeps track of each thread through the use of various control blocks such as the ACE.

Timeout: Temporary or permanent cessation of a process, subroutine, etc., upon the occurrence of an event such as the passage of a specified period of time, the performance of a certain number of repetitions of a process, and the like.

Variable: A location in memory associated with a particular identifier and set to a particular value by a computer program, e.g., by an application program or an operating-system program. For example, a computer program for processing employee payroll information might define a variable EmployeeName that, at a particular time, is set to the value "Smith."

XSB: An MVS control block; used to handle SRBs that are suspended and later resumed.

BIBLIOGRAPHY

The following bibliography is included for convenient reference.

[K&R] Brian W. Kernighan & Dennis M. Richie, The C Programming Language (Prentice Hall 1978)

[DB2DIAG] IBM Database 2, Version 2, Diagnosis Guide and Reference, manual no. LY27-9536.

[MVSXA] MVS Extended Architecture Debugging Handbook, Manual #LC28-1169 (IBM).

[RanSeh] Jay Ranade, Mukesh Sehgal, Phyllis Elkind, & Joseph Grossman, DB2Concepts, Programming, and Design (McGraw-Hill, Inc., 1991).

What is claimed is:

1. A method of dynamically adding a new active log to a DATABASE 2 (DB2) subsystem without cycling DB2, said subsystem having a log management control block (LMB) chain that includes a log data set active log (LDSD) control block for each active log, a bootstrap data set (BSDS) data set having at least one BSDS active log record, and a cache including cached portions of the BSDS data set, said method comprising the steps of:

(a) verifying that sufficient storage in the BSDS active log record is available to add the new active log;

(b) invoking the DB2 module DSNJDS01 with an ALLOCATE request to allocate the new active log data set and create a new LDSD control block for the new active log data set;

(c) setting NEW and REUSABLE status flags in the new LDS D control block;

(d) completing initialization of the new LDSD control block;

(e) obtaining the LMB LOG WRITE latch;

(f) adding the new LDSD control block to the LMB chain;

(g) obtaining the BSDS ACCESS latch;

(h) updating the BSDS to show the presence of the new active log;

(i) updating the BSDS cache; and (j) releasing said latches.

2. A method of dynamically removing a specified active log from a DATABASE 2 (DB2) subsystem without cycling DB2, said subsystem having a log management control block (LMB) chain that includes a log data set active log (LDSD) control block for each active log, a bootstrap data set (BSDS) data set, and a cache including cached portions of the BSDS data set, said method comprising the steps of:

(a) obtaining the LMB LOG WRITE latch;

(b) removing the LDS D control block of the specified active log from the LMB chain;

(c) invoking the DB2 module DSNJDS01 with a DEALLOCATE request to deallocate said active log data set;

(d) if the DEALLOCATE request is successfully completed, then continuing, else replacing said LDSD control block on the LMB chain;

(e) obtaining the BSDS ACCESS latch;

(f) updating the BSDS to show the removal of the specified active log;

(g) updating the BSDS cache; and (h) releasing said latches.

* * * * *